M. L. CRANDALL.
WATER FILTER.
APPLICATION FILED DEC. 23, 1919.

1,430,950.

Patented Oct. 3, 1922.

Inventor
Merton L. Crandall,
By
Attorneys

Patented Oct. 3, 1922.

1,430,950

UNITED STATES PATENT OFFICE.

MERTON L. CRANDALL, OF JACKSON, MICHIGAN.

WATER FILTER.

Application filed December 22, 1919. Serial No. 346,905.

*To all whom it may concern:*

Be it known that I, MERTON L. CRANDALL, a citizen of the United States of America, residing at Jackson, in the county of Jackson and State of Michigan, have invented certain new and useful Improvements in Water Filters, of which the following is a specification, reference being had therein to the accompanying drawings.

In my Patent No. 1,090,283, granted March 17, 1914, there is disclosed a water filter or strainer especially designed for purifying rain water or other water introduced from a pail, spout or the like, and not under any head or pressure, as in the case of a faucet filter.

My present invention aims to improve the construction disclosed in my prior patent by providing a constructive arrangement of parts which is more satisfactory as a water filter in many particulars. First, provision is made so that the main inlet conduit of the filtering device may be flushed and thoroughly cleansed; second, the filter bed or material employed for removing impurities is disposed so that it may be readily renewed and the complete filter cleaned, and third, a catch basin is provided for large and small foreign matter that may be carried into the filter by the water admitted thereto.

My invention further aims to accomplish the above and other objects by a novel mechanical construction that will be hereinafter specifically described and then claimed, and reference will now be had to the drawing, wherein—

Figures 1, 2, 3:
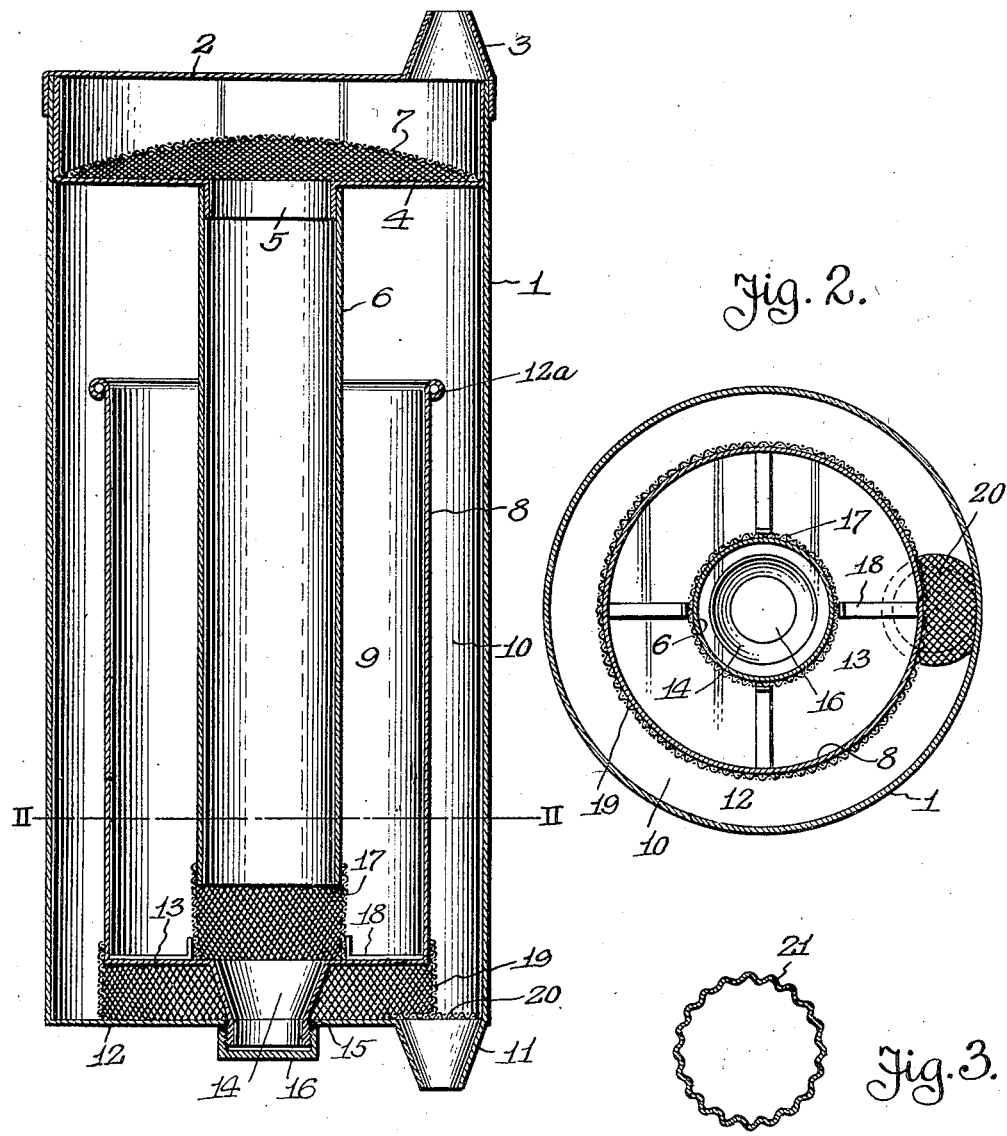
Figure 1 is a vertical sectional view of the filtering device.
Fig. 2 is a horizontal sectional view taken on the line II—II of Fig. 1.
Fig. 3 is a horizontal sectional view of a modified form of central conduits for the filter.

The filtering device comprises a cylindrical receptacle or casing 1, having its upper end provided with a detachable cap 2, and at one edge of the cap 2 is a conical shaped inlet connection 3 over or in which may be mounted the end of a water inlet pipe, as a spout (not shown). The shape of the inlet member 3 is such that the spout may be readily fitted therein, and it is possible to cut off the inlet connection 3 so that it will provide as large a communication, as possible, between the casing 1 and the water supply pipe therefor.

Mounted within the upper end of the casing 1 is a cylindrical catch basin 4 provided with a concentric depending sleeve 5 on which is mounted a central conduit 6 which extends downwardly in the casing 1 and is adapted to conduct water from the basin 4 to a point in proximity to the bottom part of the casing 1. In the catch basin 4 is placed a convex or concave strainer 7, preferably made of interwoven wire and this strainer is adapted to prevent large pieces of foreign matter from being carried into the conduit 6. For instance, when the basin 4 is receiving rain water from a spout the strainer 7 will prevent feathers, leaves and similar matter from passing into the conduit 6, and since the strainer is of an area corresponding to the basin 4, there will be sufficient space on the strainer for water to pass therethrough, without the strainer becoming necessarily clogged after each rain fall. Since the cap 2 is detachable, the strainer 7 may be removed and easily cleaned.

Surrounding the central conduit 6 within the casing 1 is a cylindrical shell 8 which has its walls intermediate the walls of the conduit 6 and the casing 1 so as to provide two annular chambers 9 and 10, the chamber 9 corresponding in depth to the shell 8 and the chamber 10 extending from the bottom of the basin 4 to the bottom of the casing 1, where said chamber communicates with an inverted frusto-conical shaped outlet member 11, carried by the bottom 12 of the casing 1.

This outlet connection is adapted to extend into an outlet pipe, (not shown).

The annular shell 8 has its upper end open and its edges rolled, as at 12ª, while the lower end of said shell has a bottom plate 13 in spaced relation to the bottom plate 12 of the casing 1. The bottom plate 13 has a concentric depending funnel shaped drain member 14 extending through an opening 15 in the bottom 12 and said drain member is fixed in the opening so that it may support the shell 8 in the casing 1. The drain member 14 extends below the bottom plate 12 of the casing 1, and mounted on said drain member is a cap 16 which may be screwed thereon or otherwise detachably held.

The bottom plate 13 of the shell 8 is in spaced relation to the lower end of the conduit 6, and mounted on the bottom plate 13 is a cylindrical screen 17 which has its upper edge suitably secured to the lower end of the conduit 6 and its lower edges braced by radially disposed arms 18 mounted on the bottom plate 13 of the shell 8.

Suitably connected to the lower edges of the shell 8 is a cylindrical screen 19 which has its lower edges on the bottom plate 12 of the casing 1, also on a horizontally disposed screen or strainer 20 mounted over the inner end of the outlet member 11.

The chambers 9 and 10 are adapted to be filled with charcoal or any filtering material through which water may seep or percolate, and the screen 17 is adapted to maintain the filtering material within the chamber 9 about the lower end of the conduit 6, while the screen 19 maintains the filtering material in the lower end of the casing 1 and in spaced relation to the drain member 14.

Water passing through the screen or strainer 7 enters the conduit 6, passing through the screen 17 and then upwardly through the filtering body of the chamber 9 until it overflows the upper edges of the shell 8, when the water flows downwardly through the filter body in the chamber 10 and through the outlet connection 11.

Any solid matter that passes through the screen or strainer 7 is collected within the drain member 14, and when the cap 16 is removed the conduit 6 may be flushed and thoroughly cleaned, without disturbing the filtering material within the chambers 9 and 10.

In some instances the central conduit 6 may have its walls corrugated or crimped, as indicated at 21, in Fig. 3, and such a conduit can be advantageously used in the winter time when there is danger of water freezing within the conduit. The corrugated or crimped walls of the conduit will prevent the same from bursting due to internal pressure, and it is possible to corrugate or reinforce the walls of the casing 1 and the shell 8 so as to add rigidity thereto. All of the metallic parts of the filtering device may be made of galvanized metal or any material which will not corrode, and in practice, the filtering device may be suitably secured to the wall of a building or other support so that rainwater may be collected by the filtering device and delivered to a suitable receptacle or water supply pipe. Beside using charcoal and granular material for filtering purposes, it is possible to use various kinds of chemicals so that certain properties may be imparted to the water passing through the device.

In the winter time when there is danger of freezing, the cap 16 can be removed allowing no water to remain in the conduit 6 or the shell 8. When the cap 16 is removed should any water enter the filter it would pass directly through strainer 7, conduit 6 and drain member 14 into open space outside the filter.

What I claim is:—

1. A water filter comprising a casing adapted to contain filtering material, a conduit in said casing, a screen forming part of said conduit and cooperating therewith in providing a straight axial flushing passage through said casing, and said conduit when closed adapted to form a basin and cause water to flow through said screen and the filtering material, and detachable means for closing the lower end of said conduit.

2. A water filter as characterized in claim 1, wherein a shell is mounted in said casing to provide communicating chambers with one chamber of less depth than the other, the chamber of greatest depth having its bottom substantially closed and both chambers adapted to hold a filtering material.

3. A water filter comprising a casing having water inlet and outlet connections, a catch basin in the upper end of said casing, a conduit centrally of said casing, a shell in said casing having a bottom plate in spaced relation to the lower end of said conduit, and the bottom of said casing and adapted to overflow into said casing, a screen connecting the lower end of said conduit to the bottom wall of said shell, a screen connecting the lower end of said shell to the bottom of said casing, and means establishing communication with the lower end of said conduit through the bottom of said casing.

4. A water filter comprising a cylindrical casing having inlet and outlet connections, a catch basin in the upper end of said casing provided with a strainer, a depending conduit carried by said basin, a cylindrical shell in said casing about said conduit and providing a chamber adapted to overflow into said casing, said shell having a bottom plate in spaced relation to the lower end of said conduit and the bottom of said casing, a screen connecting the bottom plate of said shell to the lower end of said conduit, a screen connecting the lower end of said shell to the bottom of said casing, a drain member carried by the bottom plate of said shell and extending out of the bottom of said casing, and a cap closing the lower end of said drain member and cooperating therewith in providing a basin axially of said conduit.

In testimony whereof I affix my signature in the presence of two witnesses.

MERTON L. CRANDALL.

Witnesses:
  A. H. De Lamater,
  H. C. Puffer.